(12) United States Patent
Smith et al.

(10) Patent No.: US 8,195,784 B2
(45) Date of Patent: Jun. 5, 2012

(54) LINEAR PROGRAMMING FORMULATION OF RESOURCES IN A DATA CENTER

(75) Inventors: Burton J Smith, Seattle, WA (US); Heather E Warncke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 12/130,668

(22) Filed: May 30, 2008

(65) Prior Publication Data

US 2009/0300134 A1 Dec. 3, 2009

(51) Int. Cl.
*G06F 15/173* (2006.01)
(52) U.S. Cl. ........ 709/223; 709/203; 709/216; 709/246; 713/201; 718/102; 726/22
(58) Field of Classification Search .................. 709/216, 709/223, 203, 246; 718/102; 726/22
See application file for complete search history.

(56) References Cited

U.S. PATENT DOCUMENTS

| | | | |
|---|---|---|---|
| 7,197,433 B2 | 3/2007 | Patel et al. | |
| 7,353,362 B2 * | 4/2008 | Georgiou et al. | 712/33 |
| 7,464,147 B1 * | 12/2008 | Fakhouri et al. | 709/223 |
| 2003/0149685 A1 | 8/2003 | Trossman et al. | |
| 2003/0163734 A1 | 8/2003 | Yoshimura et al. | |
| 2003/0193777 A1 | 10/2003 | Friedrich et al. | |
| 2004/0073673 A1 | 4/2004 | Santos et al. | |
| 2004/0117476 A1 | 6/2004 | Steele et al. | |
| 2004/0148521 A1 * | 7/2004 | Cohen et al. | 713/201 |
| 2004/0267897 A1 | 12/2004 | Hill et al. | |
| 2007/0067435 A1 | 3/2007 | Landis et al. | |
| 2007/0143759 A1 * | 6/2007 | Ozgur et al. | 718/102 |
| 2007/0192406 A1 * | 8/2007 | Frietsch et al. | 709/203 |
| 2008/0065573 A1 * | 3/2008 | Macready | 706/19 |

OTHER PUBLICATIONS

"Innovation Helps Data Centers Handle Growing Pains", at <<http://www.sybase.com/detail?id=1049514>>, Sybase Inc., vol. 4.14, 2007, pp. 4.

Zhu, et al., "Optimal Resource Assignment in Internet Data Centers", at <<http://www.hpl.hp.com/personal/Sharad_Singhal/Zhu_Mascots2001.pdf>>, IEEE, Aug. 2001, pp. 61-69.

* cited by examiner

*Primary Examiner* — Kyung H Shin
(74) *Attorney, Agent, or Firm* — Lee & Hayes, PLLC (57) ABSTRACT

An exemplary method for performing work in a data center includes receiving a request for resources in a data center, solving a linear programming formulation that accounts for the request and at least some of the resources in the data center and performing work the request based at least in part on the solving of the linear programming formulation. Such a method can include a linear programming formulation that accounts for multi-core chips and DRAM systems. Various other method, devices, systems, etc., are also disclosed.

17 Claims, 8 Drawing Sheets

LINEAR PROGRAMMING FORMULATION OF RESOURCES IN A DATA CENTER

BACKGROUND

Large scale data centers are increasingly used for a wide variety of tasks associated with applications such as electronic mail and Web browsing. For example, software as a service (SaaS) includes Web-based e-mail services (e.g., the MICROSOFT® HOTMAIL® e-mail service) where a vendor typically hosts all of the program logic and data and provides end users with access to this data over the public Internet through a Web-based user interface. A single data center can house thousands of individual devices, usually in the form of rack mounted computers, which are often servers. Consequently, many now refer to large data centers as "server farms". Various techniques described herein pertain to management of server farms.

SUMMARY

An exemplary method for performing work in a data center includes receiving a request for resources in a data center, solving a linear programming formulation that accounts for the request and at least some of the resources in the data center and performing work the request based at least in part on the solving of the linear programming formulation. Such a method can include a linear programming formulation that accounts for multi-core chips and DRAM systems. Various other method, devices, systems, etc., are also disclosed.

DESCRIPTION OF DRAWINGS

Non-limiting and non-exhaustive examples are described with reference to the following figures.

DETAILED DESCRIPTION

Various exemplary methods, devices and system described herein pertain to managing resources in one or more data centers. An exemplary method generates a linear programming (LP) formulation that accounts for various resources in a data center. In such a method, the resources may include cores and DRAM systems associated with many-core chipsets. On a more macroscopic scale, such a method may account for bandwidth to one or more servers. Such a method may further account for workload cycles, service contracts, energy/cooling costs, etc. An exemplary system includes a LP formulation and solution module to manage resources better for one or more existing data centers.

Various techniques described herein are suitable for use with many-core processors. Many-core processors offer far-reaching performance enhancements for large datacenters. In a datacenter, each many-core processor can be viewed as an individual system with a variety of resources (e.g., cores, L1 and L2 caches, DRAM controller and associated DRAM banks as well as "bandwidth" that connects the various resources). Such a view allows for formulation of an optimization problem for increasing performance of each many-core processor. Further, individual many-core optimization problems can be viewed within the context of an entire datacenter where such a formulation leads to additional opportunities for control and optimization of the entire datacenter.

An exemplary approach includes defining and optimizing a linear objective function for performance of the pieces of a many-core chip, i.e., the individual resources available on a many-core chip. In the field of Linear Programming (LP), a linear objective function, in conjunction with appropriate constraints, defines a polytope in an n-dimensional space that may be solved, for example, using the simplex algorithm. For a given many-core chip architecture, bandwidth and capacity constraints (e.g., associated with caches, DRAM controller and DRAM banks) may be imposed and the simplex algorithm used to find an optimal performance solution. Actual implementation of such a solution can provide feedback for honing the objective function and/or constraints. Further, an objective function and/or constraints may be tailored for a particular application (e.g., search, email, multimedia, etc.).

Figure 1:
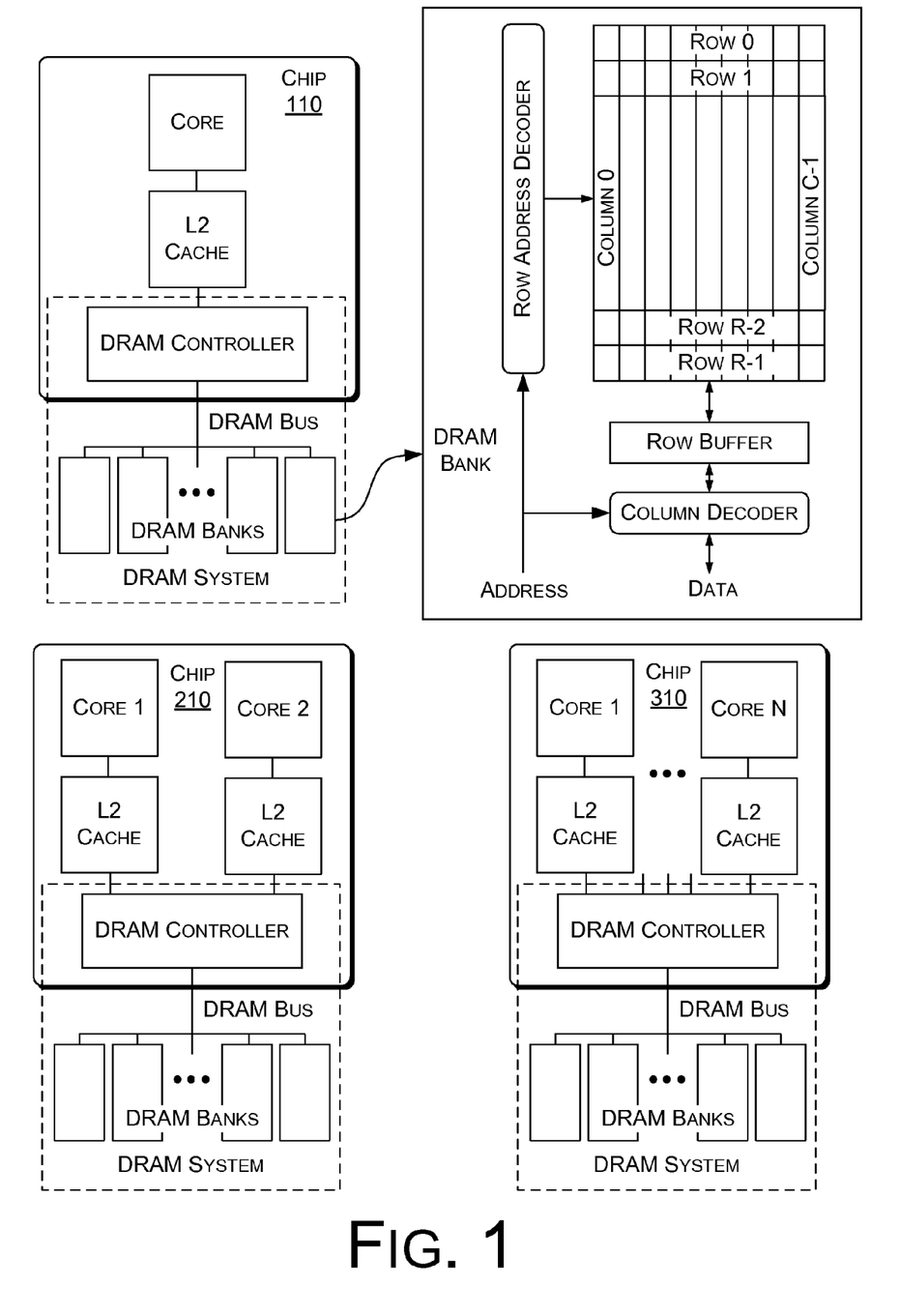
FIG. 1 is a diagram of a various chips or "chipsets" and DRAM systems, including many-core chipsets.

FIG. 1 shows various chip architectures to provide a brief background on multi-core technology and DRAM memory systems. Various components abstract details yet allow for an understanding of how the design of existing memory systems can be managed.

FIG. 1 shows the high-level architecture of a processing system with one core 110 (single-core), two cores (dual-core) 210 and N cores (N-core) 310. A "core" includes the instruction processing pipelines (integer and floating-point), instruction execution units, and the L1 instruction and data caches. Many general-purpose computers manufactured today look like the dual-core system in that they have two separate but identical cores. In some systems (AMD Athlon/Turion/Opteron, Intel Pentium-D), each core has its own private L2 cache, while in others (Intel Core Duo, IBM Power 4/5) the L2 cache is shared between different cores. The choice of a shared versus non-shared L2 cache affects the performance of the system and, as described herein, a shared cache can be optionally managed or monitored for purposes of data center operations.

In some instances, a system provides a private L2 cache to each core or provides "quotas" for each core in a shared L2 cache. Regardless of whether or not the L2 cache is shared, the DRAM Memory System of current multi-core systems is shared among all cores. In contrast to the L2 cache, assigning a private DRAM memory system to each core would significantly change the programming model of shared-memory multiprocessing, which is commonly used in commercial applications.

In a multi-core system, partitioning the DRAM memory system across cores (while maintaining a shared-memory programming model) is conventionally undesirable because:

1. Partitioning requires more DRAM chips along with a separate memory controller for each core, which significantly increases the cost of a commodity general-purpose system, especially in systems that incorporate tens of cores on chip; and 2. In a partitioned DRAM system, a processor accessing a memory location needs to issue a request to the DRAM partition that contains the data for that location. This incurs additional latency and a communication network to access another processor's DRAM if the accessed address happens to reside in that partition.

Hence in conventional systems, each core has a private L2 cache but all cores share the DRAM memory system.

A DRAM memory system consists of three major components: (1) the DRAM banks that store the actual data, (2) the DRAM controller (scheduler) that schedules commands to read/write data from/to the DRAM banks, and (3) DRAM address/data/command buses that connect the DRAM banks and the DRAM controller.

A DRAM memory system is conventionally organized into multiple banks such that memory requests to different banks can be serviced in parallel. As shown in FIG. 1, each DRAM bank has a two-dimensional structure, consisting of multiple rows and columns. Consecutive addresses in memory are located in consecutive columns in the same row. The size of a row varies, but it is usually between 1-8 Kbytes in commodity DRAMs. In other words, in a system with 32-byte L2 cache blocks, a row contains 32-256 L2 cache blocks.

Each bank has one row-buffer and data can only be read from this buffer. The row-buffer contains at most a single row at any given time. Due to the existence of the row-buffer, modern DRAMs are not truly random access (equal access time to all locations in the memory array). Instead, depending on the access pattern to a bank, a DRAM access can fall into one of the three following categories:

1. Row hit: The access is to the row that is already in the row-buffer. The requested column can simply be read from or written into the row-buffer (called a column access). This case results in the lowest latency (typically 30-50 ns round trip in commodity DRAM, including data transfer time, which translates to 90-150 processor cycles for a core running at 3 GHz clock frequency). Note that sequential/streaming memory access patterns (e.g. accesses to cache blocks A, A+1, A+2, . . . ) result in row hits since the accessed cache blocks are in consecutive columns in a row. Such requests can therefore be handled relatively quickly.

2. Row conflict: The access is to a row different from the one that is currently in the row-buffer. In this case, the row in the row-buffer first needs to be written back into the memory array (called a row-close) because the row access had destroyed the row's data in the memory array. Then, a row access is performed to load the requested row into the row-buffer. Finally, a column access is performed. Note that this case has much higher latency than a row hit (typically 60-100 ns or 180-300 processor cycles at 3 GHz).

3. Row closed: There is no row in the row-buffer. Due to various reasons (e.g. to save energy), DRAM memory controllers sometimes close an open row in the row-buffer, leaving the row-buffer empty. In this case, the required row needs to be first loaded into the row-buffer (called a row access). Then, a column access is performed.

Due to the nature of DRAM bank organization, sequential accesses to the same row in the bank have low latency and can be serviced at a faster rate. However, sequential accesses to different rows in the same bank result in high latency. Therefore, to maximize bandwidth, current DRAM controllers schedule accesses to the same row in a bank before scheduling the accesses to a different row even if those were generated earlier in time. Such a policy causes unfairness in a DRAM system.

Figure 2:
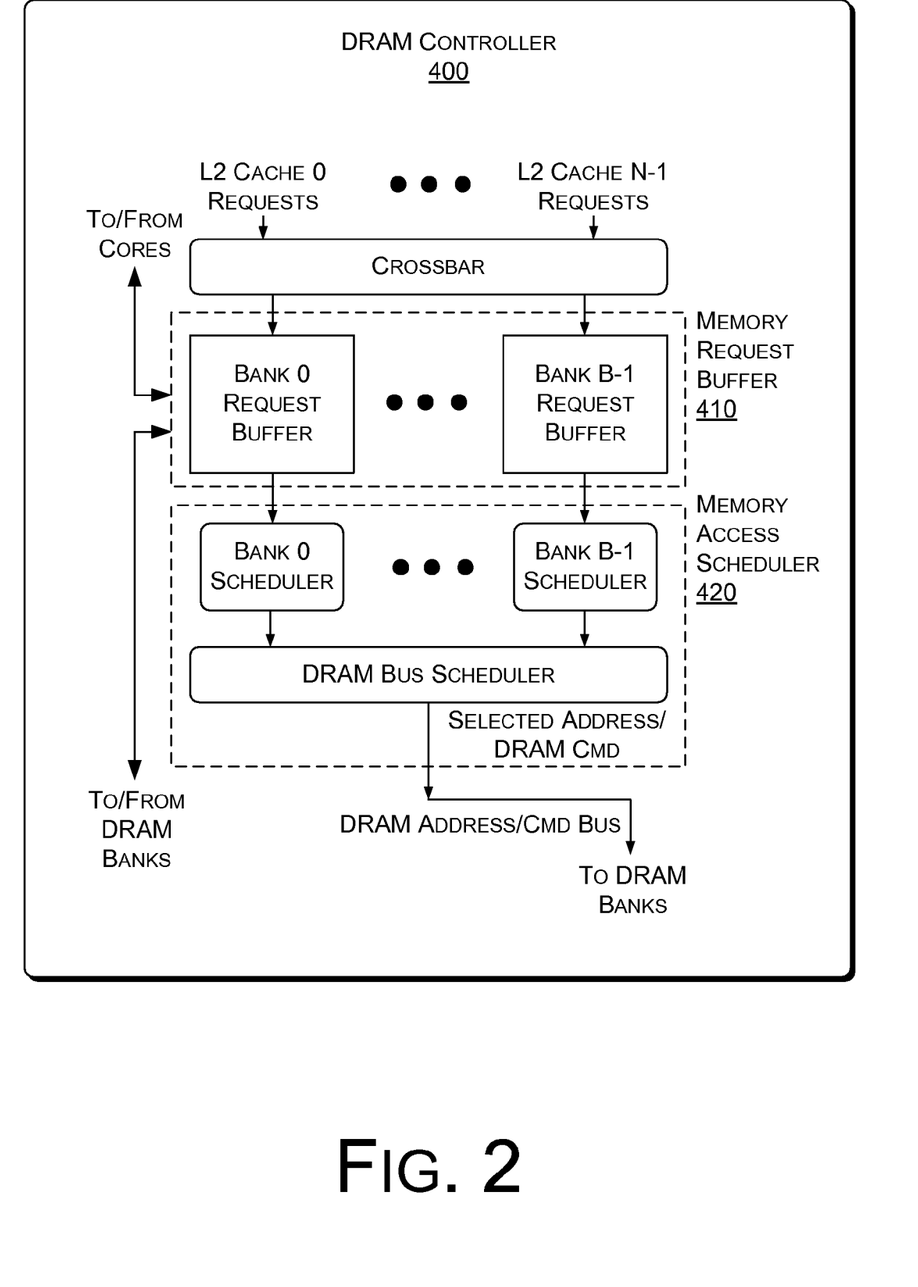
FIG. 2 is a diagram of a DRAM controller that may be used in the chips of FIG. 1.

FIG. 2 shows the architecture of a conventional DRAM controller 400. The DRAM controller 400 is the mediator between the on-chip caches and the off-chip DRAM memory. It receives read/write requests from L2 caches. The addresses of these requests are at the granularity of the L2 cache block. The main components of the controller 400 are the memory request buffer 410 and the memory access scheduler 420.

The memory request buffer 410 buffers the requests received for each bank. It consists of separate bank request buffers. Each entry in a bank request buffer 410 contains the address (row and column), the type (read or write), the timestamp, and the state of the request along with storage for the data associated with the request.

The memory access scheduler 420 is often considered the "brain" of the memory controller 400. Its main function is to select a memory request from the memory request buffer 410 to be sent to DRAM memory. The scheduler 420 has a two-level hierarchical organization. The first level consists of separate per-bank schedulers. Each bank scheduler keeps track of the state of the bank and selects the highest priority request from its bank request buffer. The second level consists of an across-bank scheduler that selects the highest-priority request among all the requests selected by the bank schedulers. When a request is scheduled by the memory access scheduler, its state is updated in the bank request buffer, and it is removed from the buffer when the request is served by the bank (these detailed control paths are not shown in FIG. 2).

Current memory access schedulers are designed to maximize the bandwidth obtained from the DRAM memory. For example, a simple request scheduling algorithm that serves requests based on a first-come-first-serve policy is prohibitive, because it incurs a large number of row conflicts. Instead, current memory access schedulers usually employ what is called a First-Ready First-Come-First-Serve (FR-FCFS) algorithm to select which request should be scheduled next. This algorithm prioritizes requests in the following order in a bank:

1. Row-hit-first: A bank scheduler gives higher priority to the requests that would be serviced faster. In other words, a request that would result in a row hit is prioritized over one that would cause a row conflict.

2. Oldest-within-bank-first: A bank scheduler gives higher priority to the request that arrived earliest.

Selection from the requests chosen by the bank schedulers is done as follows:

Oldest-across-banks-first: The across-bank DRAM bus scheduler selects the request with the earliest arrival time among all the requests selected by individual bank schedulers.

In summary, this algorithm strives to maximize DRAM bandwidth by scheduling accesses that cause row hits first (regardless of when these requests have arrived) within a bank. Hence, streaming memory access patterns are prioritized within the memory system. The oldest row-hit request has the highest priority in the memory access scheduler. In contrast, the youngest row-conflict request has the lowest priority.

As described above, current DRAM memory systems do not distinguish between the requests of different threads (i.e. cores). Requests from a thread with a particular access pattern can get prioritized by the memory access scheduler over requests from other threads, thereby causing the other threads to experience very long delays.

Two reasons as to why one thread can deny service to another in current DRAM memory systems include:

1. Unfairness of row-hit-first scheduling: A thread whose accesses result in row hits gets higher priority compared to a thread whose accesses result in row conflicts. An access pattern that mainly results in row hits is referred to as a pattern with high row-buffer locality. Thus, an application that has a high row-buffer locality (e.g. one that is streaming through memory) can significantly delay another application with low row-buffer locality if they happen to be accessing the same DRAM banks.

2. Unfairness of oldest-first scheduling: Oldest-first scheduling implicitly gives higher priority to those threads that can generate memory requests at a faster rate than others. Such aggressive threads can flood the memory system with requests at a faster rate than the memory system can service. As such, aggressive threads can fill the memory system's buffers with their requests, while less memory-intensive threads are blocked from the memory system until all the earlier-arriving requests from the aggressive threads are serviced.

As described herein, an exemplary management system for multi-core machines can account for such existing behavior to manage data center resources more effectively. As described herein, an exemplary system can allow for sharing of resources across chips.

Figure 3:
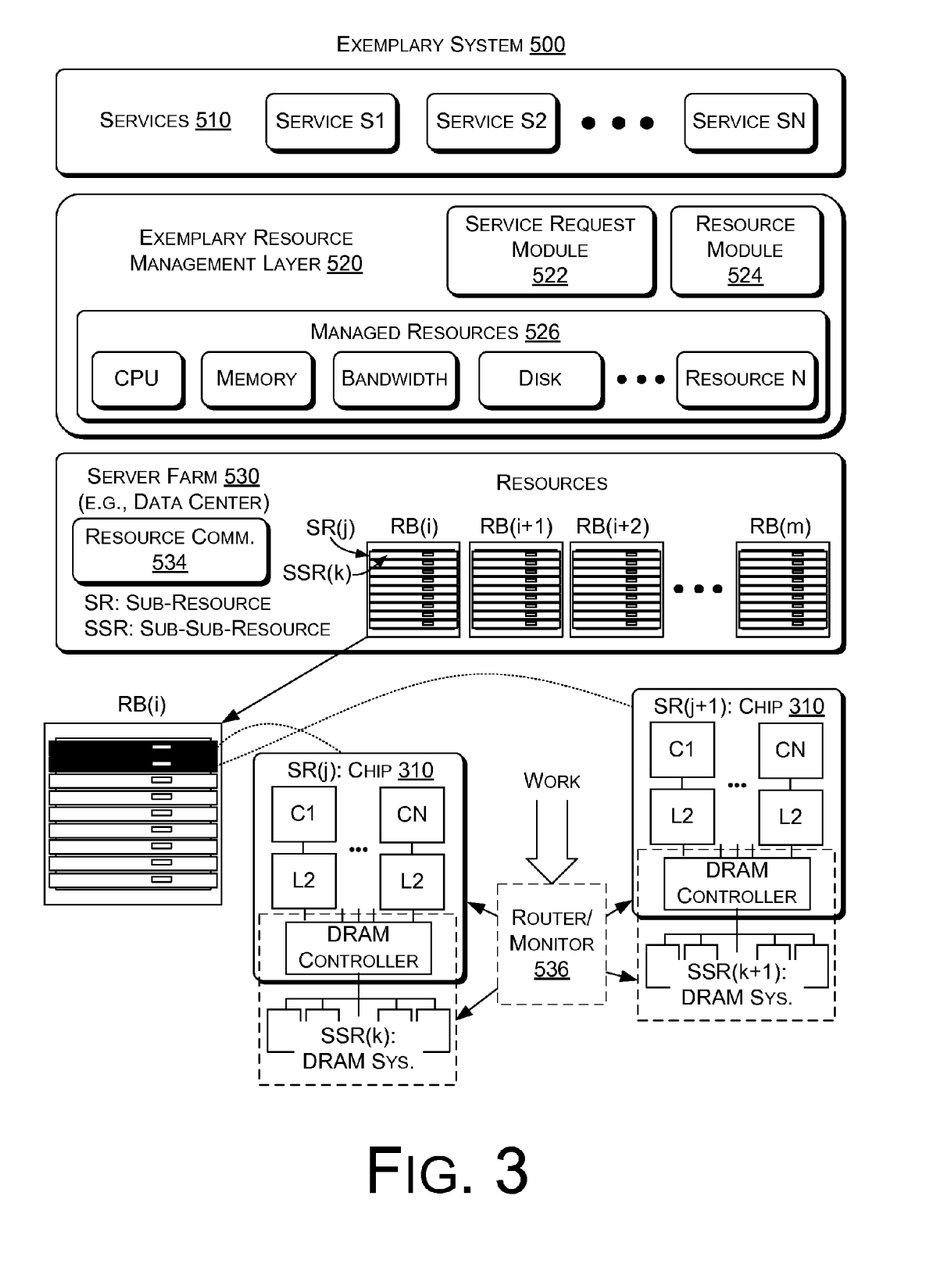
FIG. 3 is a diagram of an exemplary system that includes services, a resource management layer and servers in a server farm.

FIG. 3 shows an exemplary system 500 that includes services 510 that request resources from a server farm 530 via an exemplary resource management layer 520. The server farm 530 includes undedicated resources for various services. For example, a resource block RB(i) includes a sub-resource SR(j), which includes a sub-sub-resource SSR(k). The resources may be processor, memory, bandwidth, disk, I/O, etc., resources.

The resource monitoring layer 520 includes a service request module 522 for receiving requests from services 510 and a resource module 524 for managing resource information, for example, from a set of managed resources 526 (e.g., processor, memory, bandwidth, disk, I/O, etc., resources).

In the example of FIG. 3, the server farm 530 includes a resource communication module 534 that communicates with the resource management layer 520. The resource communication module 534 can be configured to provide information about resources. For example, each resource block (e.g., RB(i) to RB(m)) can include a resource block address. In such a configuration, the communication module 534 allows the management layer 520 to access one or more individual resource blocks. Once a connection is established, information about one or more resource blocks can be communicated to the monitoring layer 520. Information may be provided as to resources, resource utilization and resource availability. Table 1, below, illustrates addresses and information for resources in a server farm.

TABLE 1

| | Resource Information | | | |
|---|---|---|---|---|
| | RB | | | |
| | RB (1) | RB (2) | RB (3) | RB (4) |
| Address | 10.111.12.0 | 10.111.12.1 | 10.111.12.2 | 10.111.12.3 |
| Bandwidth | 15% utilized | 45% utilized | 5% utilized | 0% utilized |
| SR (Servers) | 25% utilized | 60% utilized | 5% utilized | 0% utilized |
| SSR (CPUs) | 18% utilized | 20% utilized | 2% utilized | 0% utilized |
| SSR (Memory) | 3% utilized | 50% utilized | 2% utilized | 0% utilized |

TABLE 1-continued

| | Resource Information | | | |
|---|---|---|---|---|
| | RB | | | |
| | RB (1) | RB (2) | RB (3) | RB (4) |
| SSR (I/O) | 25% utilized | 60% utilized | 2% utilized | 0% utilized |
| SSR (disk) | 2% utilized | 10% utilized | 65% utilized | 0% utilized |

In the example of Table 1, the patterns of utilization can infer workload type. For example, the resource block RB(3) has a high disk utilization, which can infer that RB(3) is being used for storage with periodic access. In contrast, RB(2) has a high I/O utilization and bandwidth utilization, which can infer that RB(2) is being used for I/O intensive tasks.

Table 1 includes information organized according to utilization and resource block. Information may be organized in a block specific manner and/or in a server-by-server manner. For example, in FIG. 3, a server in RB(i) includes a sub-resource SR(j), which is a many core chip 310 with a DRAM system as a sub-sub-resource SSR(k). In general, information may be acquired for CPU, memory, I/O, disk, etc., utilization. In general, available information allows the management layer 520 to manage requests for resources.

The exemplary system 500 further includes an optional router and/or monitor 536, which may be implemented on a per server block or other basis. As shown in FIG. 3, the router/monitor 536 can receive work (i.e., via requests) and distribute the tasks across resources such as SR(j), SR(j+1), SSR(k) and SSR(k+1). In such a system, work may use resource SR(j) for processing and resources SSR(k) and SSR (k+1) for memory. As described further below, an exemplary method 800 of FIG. 6 can be used to program the router 536 to manage workload for a block of servers.

As already described, chips and DRAM systems have certain constraints. An exemplary methods uses various constraints to form a linear function for optimization via linear programming techniques.

Linear programming (LP) involves optimization of a linear objective function, subject to linear equality and inequality constraints. LP can find the best outcome (e.g. maximum profit, least effort, etc) given some list of constraints (e.g. only working 30 hours a week, not doing anything illegal, etc), using a linear mathematical model. More formally, given a polytope (for example, a polygon or a polyhedron), and a real-valued affine function defined on the polytope:

$$f(x_1, x_2, \ldots, x_n) = a_1 x_1 + a_2 x_2 + \ldots + a_n x_n + b$$

Linear programming typically has the goal of finding a point in the polytope where this function has the smallest (or largest) value. While such points may not exist, if they do, searching through the polytope vertices is guaranteed to find at least one of them.

Linear programs are problems that can be expressed in canonical form:

Maximize $c^T x$;
Subject to $Ax \leq b$;
Where $|x| \geq 0$.

In this form, "x" represents the vector of variables, while "c" and "b" are vectors of coefficients and A is a matrix of coefficients. The expression to be maximized or minimized is called the objective function ($c^T x$ in this case). The equations $Ax \leq b$ are the constraints which specify a convex polyhedron over which the objective function is to be optimized.

Geometrically, linear constraints of an LP formulation define a convex polyhedron, which is called the feasible region. Since the objective function is also linear, hence a convex function, all local optima are automatically global optima (by the KKT theorem). The linearity of the objective function also implies that the set of optimal solutions is the convex hull of a finite set of points—usually a single point.

Barring pathological conditions that can make an LP solution "infeasible" (which are often ruled out by properly stating resource constraints integral to the formulation), the optimum is always attained at a vertex of the polyhedron. However, the optimum is not necessarily unique: it is possible to have a set of optimal solutions covering an edge or face of the polyhedron, or even the entire polyhedron (e.g., if the objective function were constant).

As described herein, an exemplary method forms an objective function for a data center based on resources and associated constraints. Solutions provided by optimization of the objective function can assist in routing of tasks in the data center, scheduling of tasks in the data center, and design.

Figure 4:
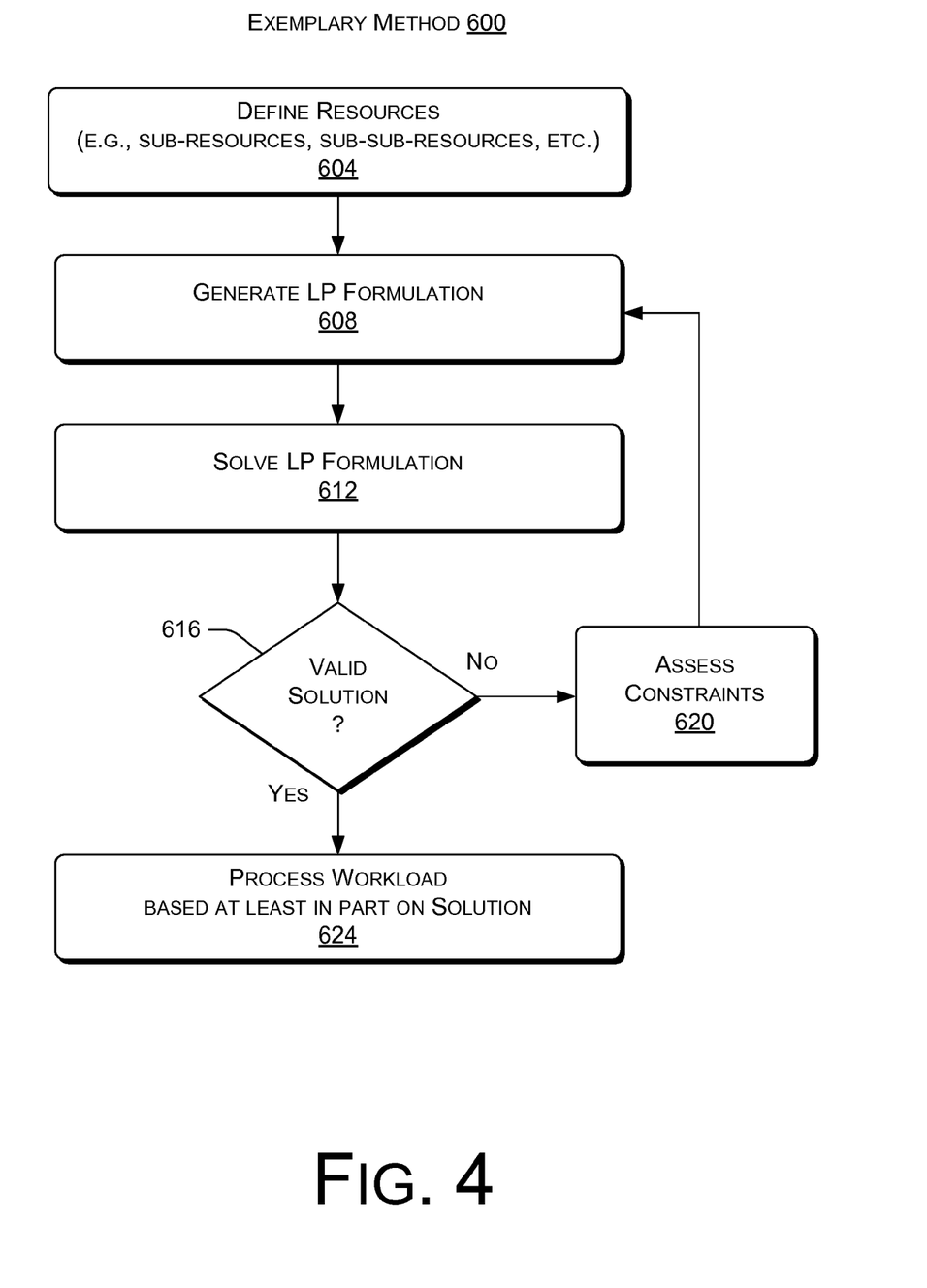
FIG. 4 is a diagram of an exemplary method for processing workload based at least in part on a solution to a linear programming formulation of data center resources.

FIG. 4 shows an exemplary method 600 for processing workload in a data center. The method 600 commences in a definition block 604 that defines resources, which may include defining sub-resources and optionally sub-sub-resources. A generation block 608 generates a LP formulation based at least in part on the defined resources. The LP formulation may account for a task or tasks associated with one or more requests for resources. The LP formulation may also account for current resource utilization, for example, a monitoring system can provide information as to the current status of resources and optionally resources required for queued jobs. Next, a solution block 612 solves the LP formulation.

In the example of FIG. 4, a decision block 616 performs a sanity check on the solution. For example, the solution may be compared to prior solutions that were successfully implemented in the data center. Further, where a solution does not pas a sanity check, such information may be used to generate another LP formulation.

As described further below, the exemplary method 600 optionally examines slackness to decide whether a solution is valid for purposes related to resource utilization (e.g., scheduling, routing, etc.).

In the instance the decision block 616 does not find the solution valid for the data center, the method 600 continues in an assessment block 620 that can assess, for example, LP constraints.

In the instance the decision block 616 finds that the solution is valid for the data center, then the method 600 continues in a processing block 624 that processes workload directed to the data center (e.g., via requests) based at least in part on the solution.

With respect to the solution block 612, LP techniques include solution by the simplex algorithm. To solve a LP formulation using the simplex algorithm, the formulation is typically converted to an augmented form, which introduces non-negative slack variables to replace inequalities with equalities in the constraints. The LP formulation can then be presented as follows (e.g., to maximize variable Z):

$$\begin{bmatrix} 1 & -c^T & 0 \\ 0 & A & I \end{bmatrix} \begin{bmatrix} Z \\ x \\ x_s \end{bmatrix} = \begin{bmatrix} 0 \\ b \end{bmatrix}$$

where x, $x_s \geq 0$ and where "$x_s$" are the slack variables. As mentioned with respect to the decision block 616, slack variables may be examined to determine whether a solution is valid for a data center and optionally to examine status of resources.

With respect to slack variables and "slackness", the theorem of complementary slackness applies. To describe slackness, consider that a "primal problem" LP formulation can be converted into a dual problem, which provides an upper bound to the optimal value of the primal problem. There are two main aspects to duality theory. One is the fact that the dual of a dual linear program is the original primal linear program. Additionally, every feasible solution for a linear program gives a bound on the optimal value of the objective function of its dual. The weak duality theorem states that the objective function value of the dual at any feasible solution is always greater than or equal to the objective function value of the primal at any feasible solution. The strong duality theorem states that if the primal has an optimal solution, x*, then the dual also has an optimal solution, y*, such that cTx*=bTy*.

A linear program can also be unbounded or infeasible. Duality theory indicates that if the primal is unbounded then the dual is infeasible by the weak duality theorem. Likewise, if the dual is unbounded, then the primal must be infeasible. However, it is possible for both the dual and the primal to be infeasible.

It is possible to obtain an optimal solution to the dual when only an optimal solution to the primal is known using the complementary slackness theorem. The theorem states:

Suppose that $x=(x_1, x_2, \ldots, x_n)$ is primal feasible and that $y=(y_1, y_2, \ldots y_m)$ is dual feasible. Let $(w_1, w_2, \ldots, w_m)$ denote the corresponding primal slack variables, and let $(z_1, z_2, \ldots, z_n)$ denote the corresponding dual slack variables. Then x and y are optimal for their respective problems if and only if $x_j z_j = 0$, for j=1, 2, . . . , n, $w_i y_i = 0$, for i=1, 2, . . . , m.

Thus, if the ith slack variable of the primal is not zero, then the ith variable of the dual is equal zero. Likewise, if the jth slack variable of the dual is not zero, then the jth variable of the primal is equal to zero.

An exemplary method observes slackness in a LP formulation of data center resources. Such a method can assist in managing workload (e.g., requests) and in determining when additional resources should be added or otherwise changed.

Figure 5:
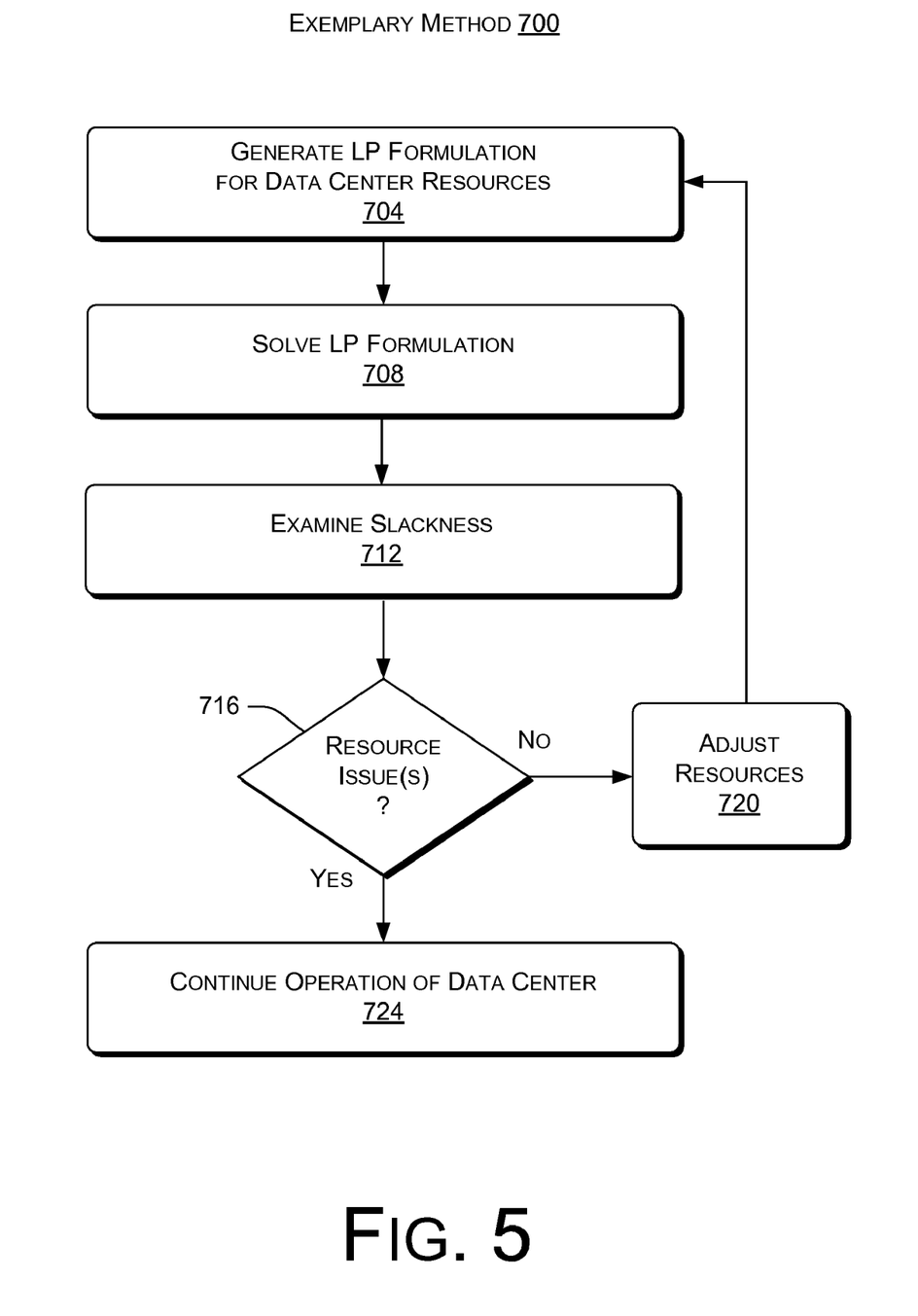
FIG. 5 is a diagram of an exemplary method for examining slackness associated with a linear programming formulation of data center resources.

FIG. 5 shows an exemplary method 700 for uncovering resource issues in a data center. The method 700 commences in a generation block 704 that generates a LP formulation based at least in part on resources in a data center. The LP formulation may account for regularly performed work, for example, workload history for the prior month. Next, a solution block 708 solves the LP formulation to provide slackness information (see, e.g., "$x_s$").

Given the slackness information, an examination block 712 examines this information, for example, with respect to current resources and expected workload for some upcoming period of time (e.g., contracts for data center utilization for an upcoming month). An operator may also run additional "simulations" using an LP formulation to decide how slackness may change for a change in workload.

According to the method 700, based at least in part on the examination, a decision block 716 decides if one or more resource issues exist. For example, the examination of the slackness information may indicate that DRAM resources for a block of servers will be insufficient to handle a contract for an upcoming month. In the example of FIG. 5, if the decision block 716 decides that an issue or issues exist, then the method 700 continues at an adjustment block 720 that can adjust resources. For example, if a particular service expects an increase in requests and hence workload performed by the data center, then the method may assign additional resources to the service based in part on the examination of slackness information. While such an examination may indicate that the increase in workload cannot be performed without additional resources, an examination may also indicate that some safety margin is at risk of being violated. Hence, the slackness information can be used for a variety of purposes with respect to data center management.

In the instance the decision block 716 decides that no resource issues exist then the method 700 can continue normal operation of the data center per the operation block 724. According to the method 700, trends in slackness or slackness for different LP formulations can be recorded and optionally relied on for making workload or infrastructure decisions.

Figure 6:
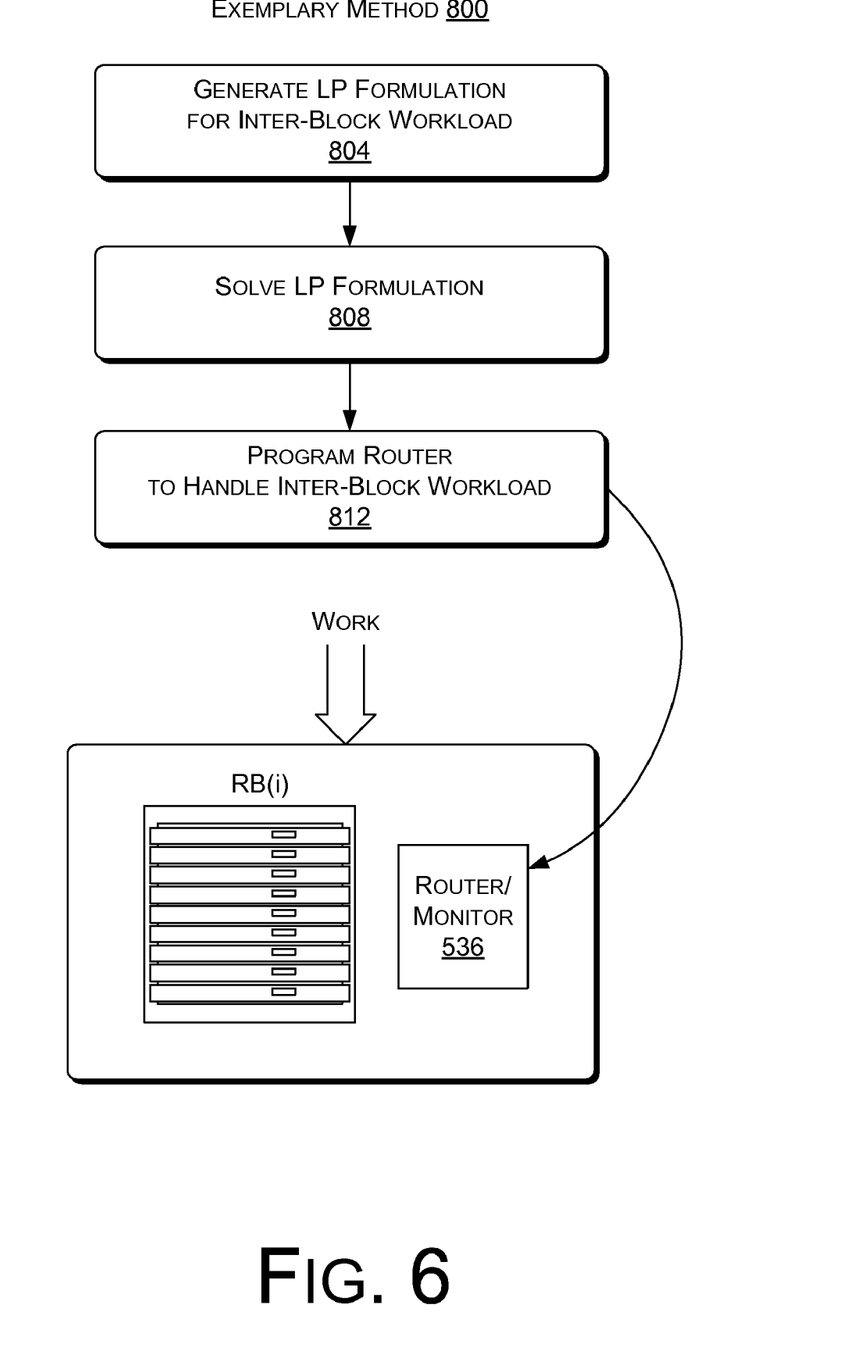
FIG. 6 is a diagram of an exemplary method for programming a router based at least in part on a solution to a linear programming formulation of data center resources.

As mentioned, an exemplary method can be used to program the router 536 to manage workload for a block of servers. FIG. 6 shows an exemplary method 800 along with a block of servers RB(i) and the router 536. The method 800 commences in a generation block 804 that generates an LP formulation for inter-block workload. For example, in a conventional data center, a task may be assigned to a particular server in a block of servers. According to the method 800, the task may be assigned to a block of servers where a single server may have responsibility for performing the task by optionally using resources conventionally reserved for other servers in the block. As mentioned, a server may access core resources on another server, DRAM resources on another server, disk resources on another server, etc.

After generation of the LP formulation, a solution block 808 solves the LP formulation. Various checks may occur to ensure that the solution can be successfully implemented. After solution, a program block 812 programs the router 536 associated with server block RB(i) to route the workload in a manner that makes use of various resources in the server block RB(i).

Figure 7:
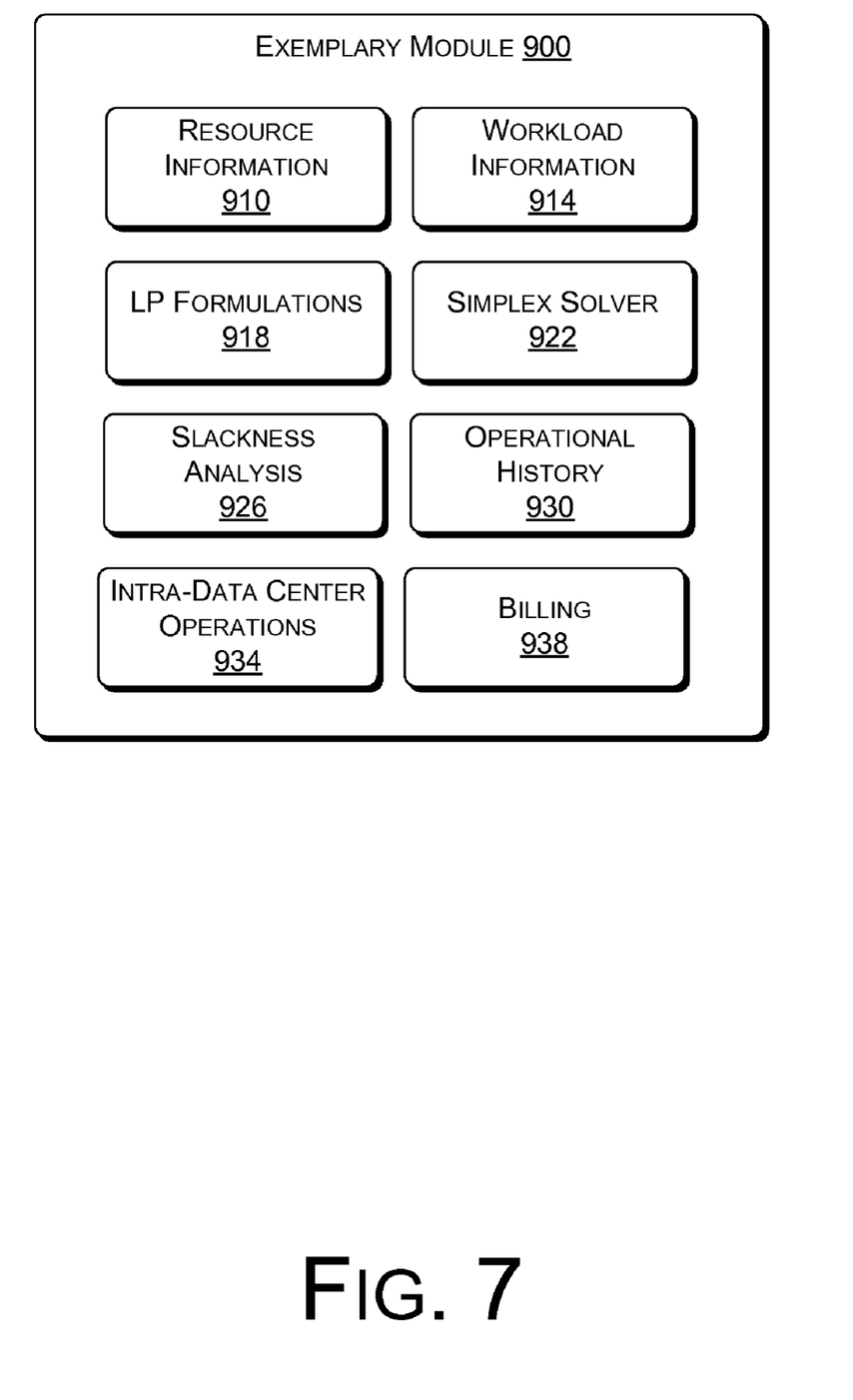
FIG. 7 is a diagram of an exemplary module for managing data center resources.

FIG. 7 shows an exemplary module 900 for managing resources in at least one data center. The module 900 may be optionally implemented as part of the resource management module 524 of the system 500 of FIG. 3. The module 900 may be modified for use in any of a variety of architectures, i.e., not limited to those of FIGS. 1, 2 and 3.

The module 900 includes features (e.g., operational routines, etc.) for resource information 910, workload information 914, LP formulations 918, simplex solvers 922, slackness analysis 926, operational history 930, intra-data center operations 934 and billing 938.

Various aspects of these features have already been described. The intra-data center operations feature 934 can provide for intra-data center operations where sharing between modules may occur. For example, a data center may share, with another data center, information gleaned from LP formulations and solutions. An expert database may be formed for purposes of LP formulation and solutions for a system of data centers.

The billing feature 938 can be used in combination with an LP formulation. For example, cost information can be included in an LP formulation where the optimal solution is based on what an entity is willing to pay for the resources. Such an approach may be considered an inverse approach. For example, a service may indicate that it can only afford to pay $X per month. This cost information can be included in a LP formulation such that the service gets the optimal resources for that cost. With respect to cost, an LP formulation may consider energy/cooling costs, bandwidth costs, human operator costs, etc.

As described herein, an exemplary module may use costs as a constraint in terms of a customer's willingness to pay and/or desire to hit a budget number in terms of a service. The billing feature 938 may allow for use of one or more other techniques for optimizing cost. For example, the billing feature 938 may account for and/or help manage data center costs (i.e., data center operational costs). Hence, as described herein, the billing feature 938 could use costs of resources (e.g., relative and/or fluctuating) plus budget information and/or rules and optionally relative task priority information (e.g. paid traffic versus free users) to assign resources to accomplish the tasks in the cheapest way. Such an approach may include safeguards to ensure that all tasks are accomplished in a timely manner (e.g., by setting one or more constraints in an LP formulation).

An LP formulation may consider operational history per the operational history feature 930. For example, if regular workload cycles exist, then this time related information may be used in an LP formulation. Such a feature may cause an LP formulation to consider time of day/night differences and a solution may indicate how to manage workload.

An exemplary LP formulation optionally accounts for whether a large task can be broken into smaller tasks. For example, if a large task can be performed in parallel or serial segments (e.g., discontinuous), then the LP formulation may account for such task related factors. For example, a solution to a LP formulation may provide a time window over which a series of tasks are performed.

As described herein, the workload feature 914 may be configured to handle priority of tasks. For example, the workload feature 914 may be able to rank and/or schedule tasks according to one or more criteria. Consider a business task versus a technical task. A technical task may need to occur in a timely manner (e.g., require a short service time) whereas a business task such as a market transaction that occurs after the market is closed may have less urgency (e.g., where a longer service time is acceptable). As such diverse tasks may be run in the same data center, the workload feature 914 may set priorities for different types of tasks, for example, either according to pre-determined business rules and/or by assessing technical needs of a specific request (e.g. tasks that need to happen immediately, such as voice traffic processing, versus requests that can queue for some period of time). Hence, the workload feature 914 can help dynamically-manage processing of different types of workloads. As described herein, workload information may be determined by, for example, business rules, discoverable technical details such as the protocol or service(s) being used, etc. Such information may be used in determining priorities, scheduling, etc.

The exemplary module 900 may provide for one or more manual overrides, for example, to proactively scheduled load management. In such an example, an operator may examine various data to more accurately ascertain anticipated workload. In turn, through a manual override feature, the operator may adjust various existing or scheduled workloads to account for future planned unique or extreme loads. For example, consider situations where a major new launch or infusion of users might otherwise disrupt a "standard" workload model. With information at hand, an operator may intervene to reduce disruption to data center operation; noting that various exemplary techniques can be useful in detecting changes and in responding dynamically to such changes by adjusting workloads. A manual override option may become active upon a change in condition(s) (e.g., an alarm/alert that resources may not meet or do not meet demand or imminent demand). Depending on the response time of an "automatic" control model, manual override may be able, in some circumstances, to allow for smoother response to extreme or rare transients in demand.

The module 900 may be used to implement various exemplary methods described herein. For example, the module 900 may be used to implement a method for performing work in a data center that includes receiving a request for resources in a data center, solving a linear programming formulation that accounts for the request and at least some of the resources in the data center, and performing work the request based at least in part on the solving of the linear programming formulation. Such a method may optionally account for any of a variety of additional factors (e.g., costs, priorities, etc.).

Figure 8:
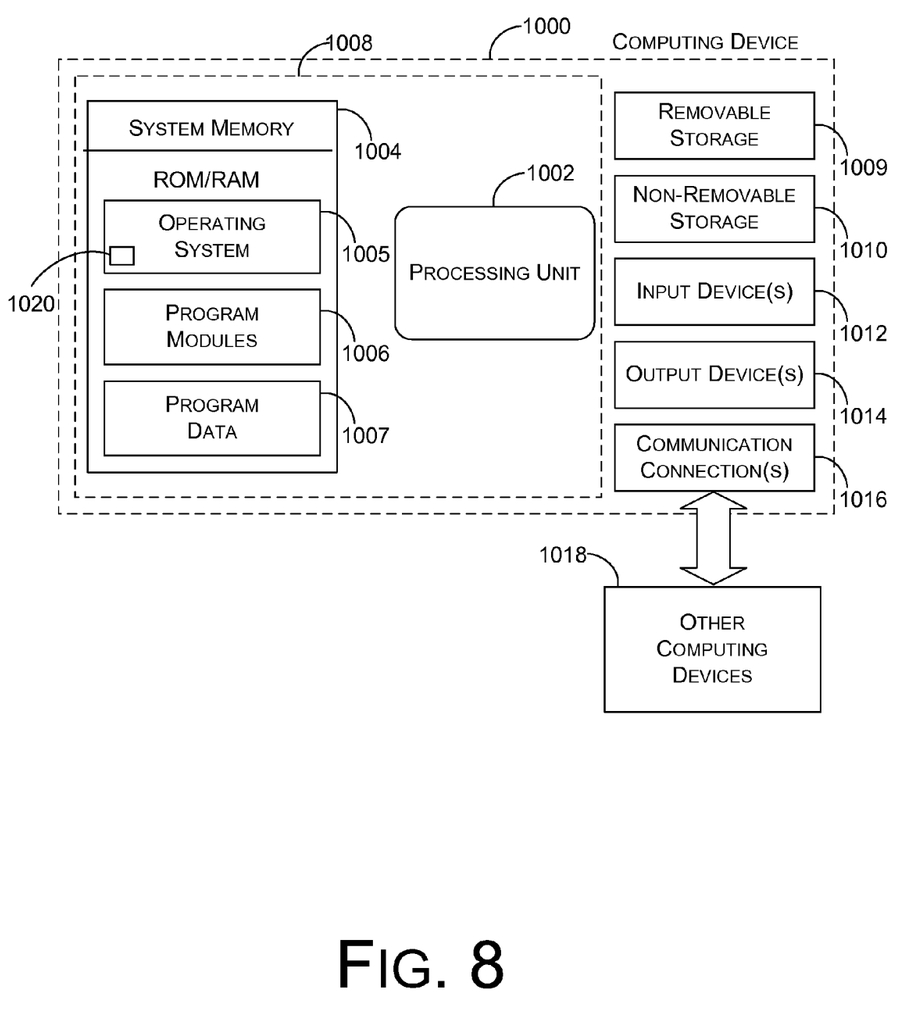
FIG. 8 is a block diagram of an exemplary computing device.

FIG. 8 illustrates an exemplary computing device 1000 that may be used to implement various exemplary components (e.g., modules) and in forming an exemplary system. For example, the servers of the system of FIG. 3 may include various features of the device 1000; noting that the processing unit 1002 may include various features of the many-core chipsets 210, 310 of FIG. 2 (e.g., as well as DRAM systems).

In a very basic configuration, computing device 1000 typically includes at least one processing unit 1002 and system memory 1004. Depending on the exact configuration and type of computing device, system memory 1004 may be volatile (such as RAM), non-volatile (such as ROM, flash memory, etc.) or some combination of the two. System memory 1004 typically includes an operating system 1005, one or more program modules 1006, and may include program data 1007. The operating system 1005 include a component-based framework 1020 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 1000 is of a very basic configuration demarcated by a dashed line 1008. Again, a terminal may have fewer components but will interact with a computing device that may have such a basic configuration.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 8 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Computing device 1000 may also have input device(s) 1012 such as keyboard, mouse, pen, voice input device, touch input device, etc. Output device(s) 1014 such as a display, speakers, printer, etc. may also be included. These devices are well know in the art and need not be discussed at length here.

Computing device 1000 may also contain communication connections 1016 that allow the device to communicate with other computing devices 1018, such as over a network. Communication connections 1016 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing resources in a data center, the method comprising:
   generating a linear programming formulation of resources in a data center having servers, each of the servers comprising:
      a many-core chip;
      a DRAM system shared among all cores of the many-core chip, the DRAM system comprising:
         off-chip DRAM banks that store data;
         a DRAM controller that mediates data transfer between at least one cache on the many-core chip and the off-chip DRAM banks; and
         DRAM address/data/command buses that connect the off-chip DRAM banks and the DRAM controller;
   solving the linear programming formulation to provide a solution;
   processing workload, using the resources in the data center, based at least in part on the solution, the processing the workload comprising:
      using the solution to program a router to receive work requests and distribute tasks associated with the work requests to the resources, the resources comprising a many-core chip and a DRAM system of each of the servers; and
      managing, by the router, the assignment of at least a part of off-chip DRAM banks of a DRAM system in a server for use by at least one other of the servers; and
   determining slackness by introducing slack variables to replace inequalities with equalities in the constraints of the linear programming formulation to facilitate the solving to provide the solution.

2. The method of claim 1 wherein the resources further comprise cores associated with many-core chips.

3. The method of claim 1 wherein the resources further comprise bandwidth of DRAM address/data/command buses.

4. The method of claim 1 wherein the resources further comprise disk storage capacity.

5. The method of claim 1 wherein the resources further comprise disk I/O capacity.

6. The method of claim 1 further comprising deciding, based at least in part on slackness, whether to assign workload to the data center.

7. The method of claim 1 wherein the solving comprises solving the linear programming formulation using a simplex algorithm.

8. The method of claim 1 wherein the linear programming formulation includes one or more cost constraints.

9. The method of claim 8 wherein the one or more cost constraints comprise an energy cost constraint.

10. The method of claim 1, wherein the data center further comprises servers configured into blocks of servers, each block of servers having an associated router.

11. The method of claim 1 wherein the resources further comprise bandwidth.

12. An architecture comprising:
a plurality of servers wherein each of the plurality of servers individually comprises:
a processor chip having a single-core, dual-cores or multi-cores;
a DRAM system shared among all cores of the processor chip, the DRAM system comprising:
off-chip DRAM banks that store data; and
a DRAM controller that mediates data transfer between at least one cache on the processor chip and the off-chip DRAM banks; and
a router programmed to distribute a task across the processor chip and the DRAM system of one of the plurality of servers to utilize the DRAM system of another of the plurality of servers, wherein the router comprises a programmable router that is programmed based at least in part on a solution to a linear programming formulation that accounts for resources of each of the plurality of servers, the programmable router being configured to receive requests and distribute tasks across the resources based on the requests.

13. The architecture of claim 12 wherein the router receives instructions based at least in part on the solution to a linear programming formulation.

14. The architecture of claim wherein the resources comprise processor chips and off-chip DRAM banks.

15. The architecture of claim 12, wherein the DRAM system further comprises a DRAM bus that connects the off-chip DRAM banks to the DRAM controller.

16. A method for performing work in a data center, the method comprising:
receiving a request for resources in a data center, the resources comprising multi-core chips and off-chip DRAM banks of DRAM systems, each multi-core chip having an associated DRAM system;
solving a linear programming formulation that accounts for the request and at least some of the resources in the data center, the solving based in part on determining slackness by introducing slack variables to replace inequalities with equalities in constraints of the linear programming formulation; and
performing work in response to the request based at least in part on the solving of the linear programming formulation, the performing the work comprising managing the use of off-chip DRAM banks of a DRAM system associated with one of the multi-core chips by another of the multi-core chips.

17. The method of claim 16 wherein the linear programming formulation accounts for multi-core chips and DRAM systems.

* * * * *